(12) United States Patent
Iwazaki et al.

(10) Patent No.: US 11,451,149 B2
(45) Date of Patent: Sep. 20, 2022

(54) POWER CONVERTER

(71) Applicant: Mitsubishi Electric Corporation, Tokyo (JP)

(72) Inventors: Kenji Iwazaki, Tokyo (JP); Koichi Arisawa, Tokyo (JP); Takashi Yamakawa, Tokyo (JP); Takuya Shimomugi, Tokyo (JP); Satoru Ichiki, Tokyo (JP); Ikuro Suga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 17/045,627

(22) PCT Filed: May 29, 2018

(86) PCT No.: PCT/JP2018/020547
§ 371 (c)(1),
(2) Date: Oct. 6, 2020

(87) PCT Pub. No.: WO2019/229847
PCT Pub. Date: Dec. 5, 2019

(65) Prior Publication Data
US 2021/0028703 A1    Jan. 28, 2021

(51) Int. Cl.
| H02M 3/158 | (2006.01) |
| H02M 1/34  | (2007.01) |
| H02M 7/06  | (2006.01) |
| H02P 27/06 | (2006.01) |
| F24F 11/88 | (2018.01) |

(52) U.S. Cl.
CPC ............ *H02M 3/158* (2013.01); *H02M 1/34* (2013.01); *H02M 7/06* (2013.01); *H02P 27/06* (2013.01); *F24F 11/88* (2018.01); *H02M 1/342* (2021.05)

(58) Field of Classification Search
CPC .......... H02P 27/00; H02P 27/04; H02P 27/06; H02P 27/08; H02P 27/085;
(Continued)

(56) References Cited

U.S. PATENT DOCUMENTS

| 7,602,626 B2 | 10/2009 | Iwata et al. |
| 8,884,564 B2 * | 11/2014 | Itoh .................. B60L 15/20 |
| | | 318/400.3 |

(Continued)

FOREIGN PATENT DOCUMENTS

| EP | 2755310 A1 | 7/2014 |
| JP | H05-199758 A | 8/1993 |

(Continued)

OTHER PUBLICATIONS

Office Action dated Mar. 16, 2022 issued in corresponding Korean patent application No. 10-2020-7033298 (and English translation).

(Continued)

*Primary Examiner* — Antony M Paul
(74) *Attorney, Agent, or Firm* — Posz Law Group, PLC

(57) ABSTRACT

A power converter is connected between a power supply source of a first direct current power and a power supply destination of a second direct current power obtained by performing power conversion on the first direct current power. The power converter includes: a switching element; a reactor; a first diode; a first capacitor; a second diode. The reactor is connected to a first end of the switching element. The first end of the switching element and a first end of the reactor are connected to a first connection point. A cathode of the first diode is connected to a second end of the reactor. The cathode of the first diode and the second end of the reactor are connected to a second connection point. The second diode includes an anode connected to the first connection point and a cathode connected to the power supply destination.

12 Claims, 6 Drawing Sheets

(58) Field of Classification Search
CPC ............. H02P 2201/03; H02P 2201/05; H02P 2201/07; H02P 2201/09; H02P 2201/13; H02P 2207/05; H02P 2207/076; H02P 7/00; H02P 7/29; H02P 7/292; H02P 1/00; H02P 1/04; H02P 1/18; H02P 1/24; H02P 1/26; H02P 1/42; H02P 1/445; H02P 1/46; H02P 1/465; H02P 3/00; H02P 6/00; H02P 6/12; H02P 6/32; H02P 11/00; H02P 11/04; H02P 11/06; H02P 13/00; H02P 21/00; H02P 21/22; H02P 23/00; H02P 23/28; H02P 25/00; H02P 25/062; H02P 25/064
See application file for complete search history.

(56) References Cited

U.S. PATENT DOCUMENTS

2013/0176015 A1 7/2013 Sato et al.
2014/0223949 A1 8/2014 Sakae et al.

FOREIGN PATENT DOCUMENTS

| JP | H09-285126 A | 10/1997 |
| JP | 2007181287 A | 7/2007 |
| JP | 2008-118784 A | 5/2008 |
| JP | 2009-011117 A | 1/2009 |
| JP | 4527767 82 | 8/2010 |
| JP | 2013-59228 A | 3/2013 |
| JP | 2014-11864 A | 1/2014 |

OTHER PUBLICATIONS

Extended European search report dated Apr. 30, 2021 issued in corresponding EP patent application No. 18920698.0.

Indian Office Action dated Mar. 30, 2021, issued in corresponding Indian Patent Application No. 202027045215 (and English Machine Translation).

* cited by examiner

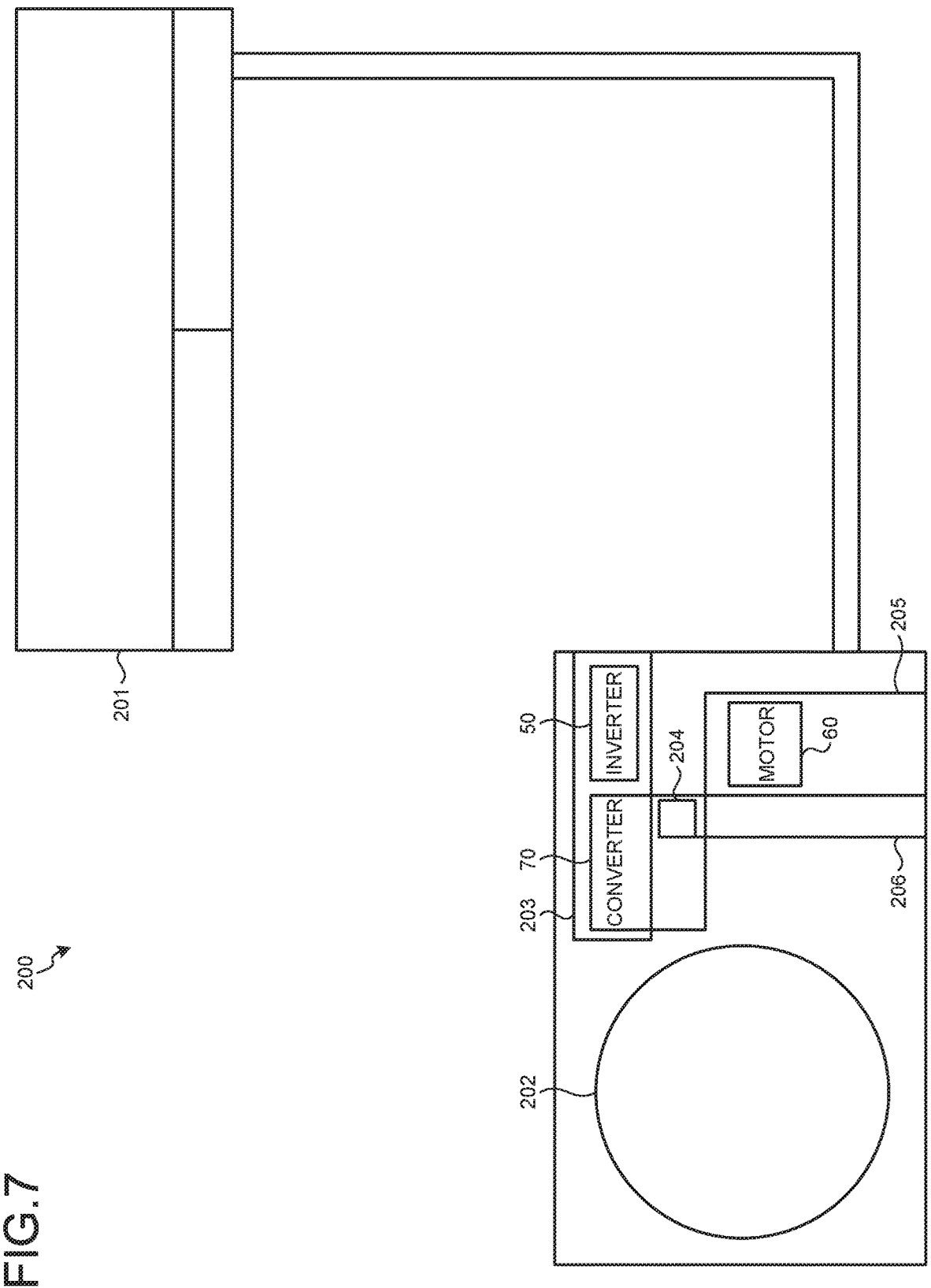

POWER CONVERTER

CROSS REFERENCE TO RELATED APPLICATION

This application is a U.S. national stage application of International Patent Application No. PCT/JP2018/020547 filed on May 29, 2018, the disclosure of which is incorporated herein by reference.

TECHNICAL FIELD

The present invention relates to a power converter that converts alternating current (AC) power into direct current (DC) power.

BACKGROUND

An electric motor (hereinafter, simply "motor") driver that uses an inverter employs a converter that converts AC power supplied from a power system into DC power. Such converter is often provided by a step-up chopper capable of controlling power to be input to the inverter for purposes of drive range extension, loss reduction, power factor improvement, and the like. A step-up chopper is a circuit including a rectification circuit, a reactor, a switching element, a reverse blocking diode, a capacitor, and the like connected to a power system. The switching element and the capacitor are connected in parallel with the rectification circuit, and both ends of each of the switching element and the capacitor are connected to the respective ends of the rectification circuit. The reactor is connected to connect the positive output terminal of the rectification circuit and the switching element. The reverse blocking diode is connected to allow current to flow from the reactor to the positive terminal of the capacitor.

The switching element performs power supply short-circuiting operation to short-circuit the output path of the rectification circuit upon transition to a conductive state. This power supply short-circuiting operation increases the current flowing in the reactor, thereby the reactor charges energy. Opening the switching element under this condition decreases the current flowing to the reactor, and accordingly generates a voltage across the reactor based on a relationship of $V=Ldi/dt$. When the voltage at the reactor exceeds the terminal voltage of the capacitor, the reverse blocking diode transitions to a conductive state, thereby causing a current to flow from the reactor to the capacitor, and the capacitor is thus charged. When the reactor completely discharges the energy, the reactor voltage decreases. When the reactor voltage falls below the capacitor terminal voltage, the reverse blocking diode is reversed. Reversing of the reverse blocking diode suppresses a current from flowing back from the capacitor to the reactor, thereby the voltage of the capacitor is maintained. Iteration of this process causes the capacitor to be charged, and thus causes the capacitor terminal voltage to exceed the supply voltage. The converter can control the input voltage of the inverter in this manner.

Reduction of the loss in the converter itself is essential to reduce the loss in a motor driver. In particular, since the switching element that performs power supply short-circuiting operation generates a switching loss in a step-up chopper, reduction of the switching loss is required. The switching loss depends on the switching characteristic of the switching element. Thus, use of a switching element employing a wide bandgap semiconductor having a good switching characteristic, such as silicon (Si), gallium nitride (GaN), gallium oxide ($Ga_2O_3$), and diamond enables the switching loss to be reduced.

Improvement in a switching characteristic may result in an increase in noise in the switching element. Noise is likely to be generated by, among others, ringing generated in the switching element itself by the switching operation, ringing caused by a recovery current generated upon reversing of the reverse blocking diode, and the like. Patent Literature 1 discloses a technology in which a snubber circuit consisting of diodes and a capacitor is provided in parallel with a switching element, and the snubber circuit absorbs the recovery current upon reversing of the reverse blocking diode to reduce noise.

PATENT LITERATURE

Patent Literature 1: Japanese Patent Application Laid-open No. H09-285126

However, the technology described in Patent Literature 1 listed above allows charge and discharge currents to flow through the snubber circuit also during switching in normal operation of the switching element. This presents a problem of occurrence of loss in the snubber circuit.

SUMMARY

The present invention has been made in view of the foregoing, and it is an object of the present invention to provide a power converter capable of reducing noise generation concurrently with loss reduction.

To solve the problem and achieve the object described above, the present invention is directed to a power converter connected between a supply source of a first DC power and a supply destination of a second direct current power obtained by performing power conversion on the first DC power. The power converter includes: a switching element; a reactor connected to one end of the switching element; and a first diode having an anode connected to a first connection point and having a cathode connected to one end of the reactor, the one end of the switching element and another end of the reactor being connected to each other at the first connection point. The power converter also includes: a first capacitor connected in parallel with the supply source and having one end connected to a second connection point, the one end of the reactor and the cathode of the first diode being connected to each other at the second connection point; and a second diode having an anode connected to the first connection point and having a cathode connected to the supply destination.

A power converter according to the present invention provides an advantage in being capable of reducing loss and noise generation.

BRIEF DESCRIPTION OF DRAWINGS

FIG. 7 is a block diagram illustrating an example configuration of an air conditioner according to a fifth embodiment.

DETAILED DESCRIPTION

A power converter according to embodiments of the present invention will be described in detail below with reference to the drawings. Note that these embodiments are not intended to limit the scope of this invention.

First Embodiment

Figure 1:
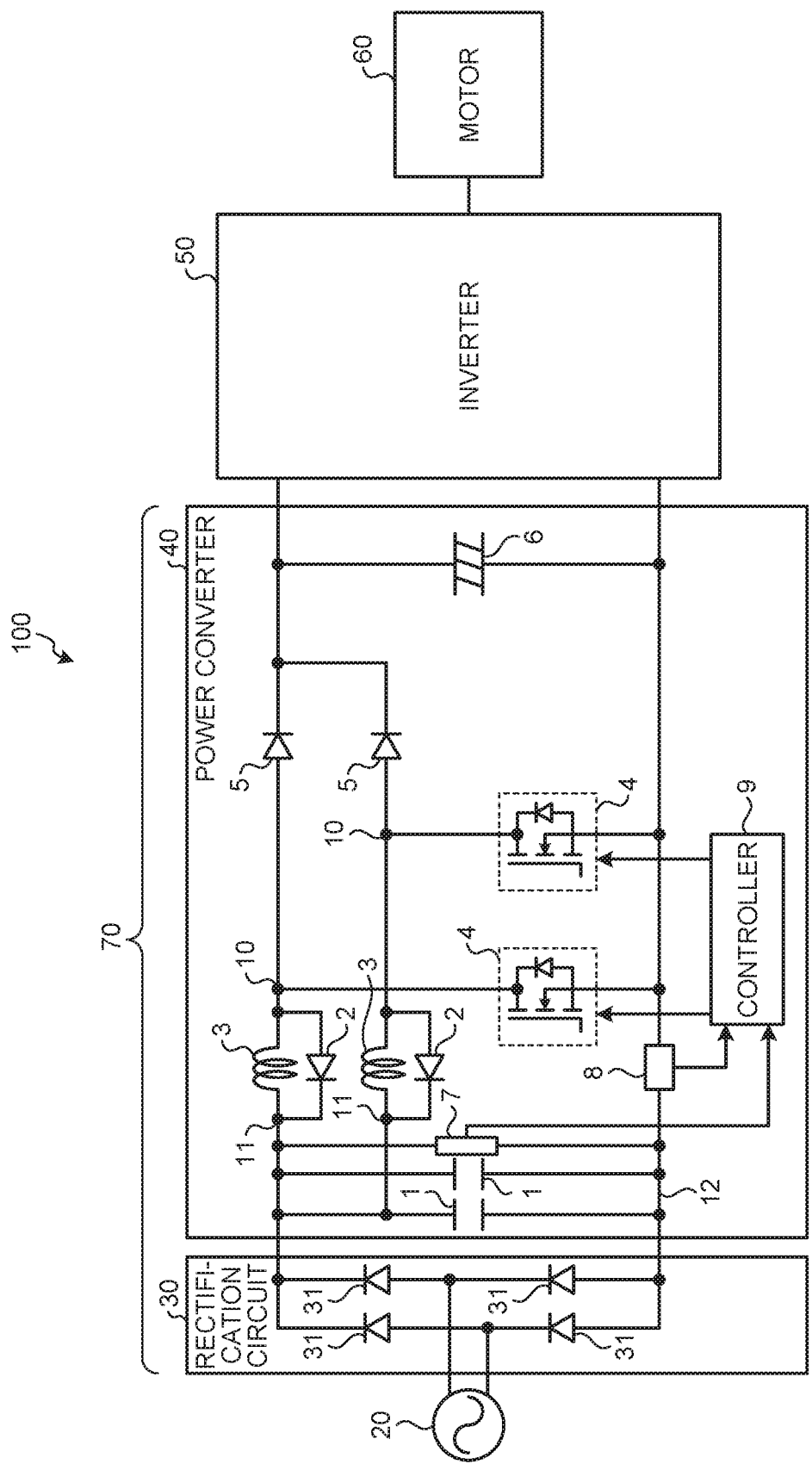
FIG. 1 is a block diagram illustrating an example configuration of a motor driver according to a first embodiment.

FIG. 1 is a block diagram illustrating an example configuration of a motor driver 100 according to a first embodiment of the present invention. The motor driver 100 includes a rectification circuit 30, a power converter 40, and an inverter 50. The rectification circuit 30 and the power converter 40 together constitute a converter 70. The motor driver 100 is connected to an AC power supply 20 and to a motor 60.

The rectification circuit 30 includes a diode bridge consisting of four rectification elements 31, and converts AC power supplied from the AC power supply 20 into DC power. The configuration of the rectification circuit 30 illustrated in FIG. 1 is merely by way of example, and the configuration of the rectification circuit 30 is not limited thereto. Note that the power supplied to the motor driver 100 is not limited to AC power, but may also be DC power. The power converter 40 may use the rectification circuit 30 or a DC power supply, as the supply source of the DC power. When DC power is supplied to the motor driver 100 from a DC power supply, the rectification circuit 30 is not needed. The power converter 40 converts the magnitude of the DC power output from the rectification circuit 30, and supplies DC power resulting from the power conversion to the inverter 50. The DC power supplied from the rectification circuit 30 to the power converter 40 may be referred to herein as first DC power. In addition, the DC power supplied by the power converter 40 to the inverter 50, i.e., the DC power resulting from the power conversion performed by the power converter 40 on the first DC power may be referred to herein as second DC power. A detailed configuration of the power converter 40 will be described later. The inverter 50 converts the DC power into AC power, and supplies the AC power to the motor 60 to drive the motor 60. From a viewpoint of the power converter 40, the inverter 50 is a supply destination of the second DC power. The motor 60 is driven by the AC power supplied from the inverter 50. The motor 60 is, for example, a motor to be installed in a compressor for use in an air-conditioning and refrigeration apparatus such as an air conditioner and a refrigerator.

A configuration of the power converter 40 will now be described. As illustrated in FIG. 1, the power converter 40 includes: two first capacitors 1; two first diodes 2; two reactors 3; two switching elements 4; two second diodes 5; a second capacitor 6; a voltage detection unit 7; a current detection unit 8; and a controller 9. Each set of the reactors 3, the switching elements 4, and the second diodes 5 constitutes a chopper circuit. In addition, each set of the first capacitors 1 and the first diodes 2 constitutes a snubber circuit. That is, the power converter 40 includes: two chopper circuits; and two snubber circuits corresponding to the respective chopper circuits.

The voltage detection unit 7 detects the voltage value of the DC power output from the rectification circuit 30. The current detection unit 8 detects a current flowing through a ground line 12 of the power converter 40. The controller 9 controls switching of each of the switching elements 4 using the voltage value detected by the voltage detection unit 7 and using the current value detected by the current detection unit 8. Note that the controller 9 may control switching of each of the switching elements 4 using a rotational speed detected by a detection unit (not illustrated) that detects the rotational speed of the motor 60. The controller 9 may also control switching of each of the switching elements 4 based on user operation in a case in which the motor driver 100 is installed in an air-conditioning and refrigeration apparatus as described above.

In the power converter 40, the switching elements 4 of the respective chopper circuits operate complementarily to each other. The switching elements 4 operate at different timings in the respective chopper circuits, but operate similarly to each other. Accordingly, the following description of a configuration and an operation of the power converter 40 will be given taking an example that includes one chopper circuit and one snubber circuit.

In the power converter 40, the switching element 4 is connected between the reactor 3 and the second diode 5. The reactor 3 has one end, the second diode 5 has an anode, and the switching element 4 has one end, connected to one another at a connection point, which is referred to herein as first connection point 10. The switching element 4 has another end connected to the ground line 12. The above first connection point 10 is further connected with an anode of the first diode 2. The first diode 2 has a cathode connected to another end of the reactor 3. As illustrated in FIG. 1, the reactor 3 and the first diode 2 are connected in parallel with each other. The another end of the reactor 3 and the cathode of the first diode 2 are connected to each other at a connection point, which is referred to herein as second connection point 11. The above second connection point 11 is further connected with one end of the first capacitor 1. The second connection point 11 is also connected with the rectification circuit 30. The first capacitor 1 has another end connected to the ground line 12. The first capacitor 1 is connected in parallel with the rectification circuit 30. In the power converter 40, the second diode 5 has a cathode connected to one end of the second capacitor 6. The cathode of the second diode 5 is also connected with the inverter 50. The second capacitor 6 has another end connected to the ground line 12. The second capacitor 6 is connected in parallel with the inverter 50.

The chopper circuits illustrated in FIG. 1 are each configured as a typical step-up chopper circuit. FIG. 1 illustrates an example in which the power converter 40 includes two chopper circuits, and the two chopper circuits are connected in parallel with each other, but this is by way of example, and the configuration thereof is not limited thereto. The power converter 40 may be configured to include a single chopper circuit, or configured to include three or more chopper circuits. In a case in which multiple chopper circuits are included, the power converter 40 is configured such that the chopper circuits are connected in parallel with each other. This means that, in the power converter 40, the second connection points 11 of the chopper circuits are connected to each other.

In the power converter 40, a DC current output from the rectification circuit 30 flows through the reactor 3 and through the second diode 5 to charge the second capacitor 6. The power charged in the second capacitor 6 will be the input power to the inverter 50.

In the power converter 40, turning on of the switching element 4 causes the output terminals of the rectification circuit 30 to be short-circuited through the reactor 3 and the switching element 4, thereby allowing a current to flow through the reactor 3 and the switching element 4.

In the power converter 40, turning on of the switching element 4 causes the current flowing through the second diode 5 to be reversed from the forward direction to the reverse direction. The forward direction is a direction from the reactor 3 to the second capacitor 6, while the reverse direction is a direction from the second capacitor 6 to the reactor 3. The second diode 5 blocks a flow of current in the reverse direction, but during a transient condition immediately after the reversing, a current flows in the reverse direction. This current flowing in the reverse direction is called recovery current. The time period from when a recovery current started flowing in the reverse direction until the recovery current is blocked is called a reverse recovery time.

The switching element 4 is herein assumed to be an element having a good switching characteristic employing a wide bandgap semiconductor such as silicon, gallium nitride, gallium oxide, and diamond. In this case, a high recovery current may flow depending on the recovery characteristic of the second diode 5. A recovery current may cause ringing to occur between the second diode 5 and the switching element 4 by resonance due to a capacitive component and an inductive component such as the switching element 4 and a wire, which generates noise in some cases.

In the first embodiment, to reduce noise generation, the power converter 40 includes snubber circuits each including the first capacitor 1 and the first diode 2. The power converter 40 suppresses the recovery current from flowing toward the switching element 4 by providing a path that allows the recovery current, having flowed through the second diode 5, to flow toward the AC power supply 20 through the first diode 2. In addition, the power converter 40 may include a capacitive element (not illustrated), such as a bead inductor, in a section between the first connection point 10 and the switching element 4. The bead inductor acts as an impedance component against the recovery current or against ringing caused by the recovery current, thereby facilitating the power converter 40 to direct the recovery current toward the first diode 2. In addition, the power converter 40 allows the recovery current, having flowed through the first diode 2, to be absorbed by the first capacitor 1, or to be directed through the first capacitor 1 to the ground line 12, thus to suppress occurrence of ringing caused by the recovery current.

Moreover, the power converter 40 directs the recovery current toward the AC power supply 20, and can thus reduce the portion including elements, loads, and the like on the ground line 12 along the return path of the recovery current. This enables the power converter 40 to reduce variation in the ground potential, and thus to stabilize the operation of the elements, loads, and the like. An example of advantages of the power converter 40 will be described below with reference to the drawings.

Figure 2:
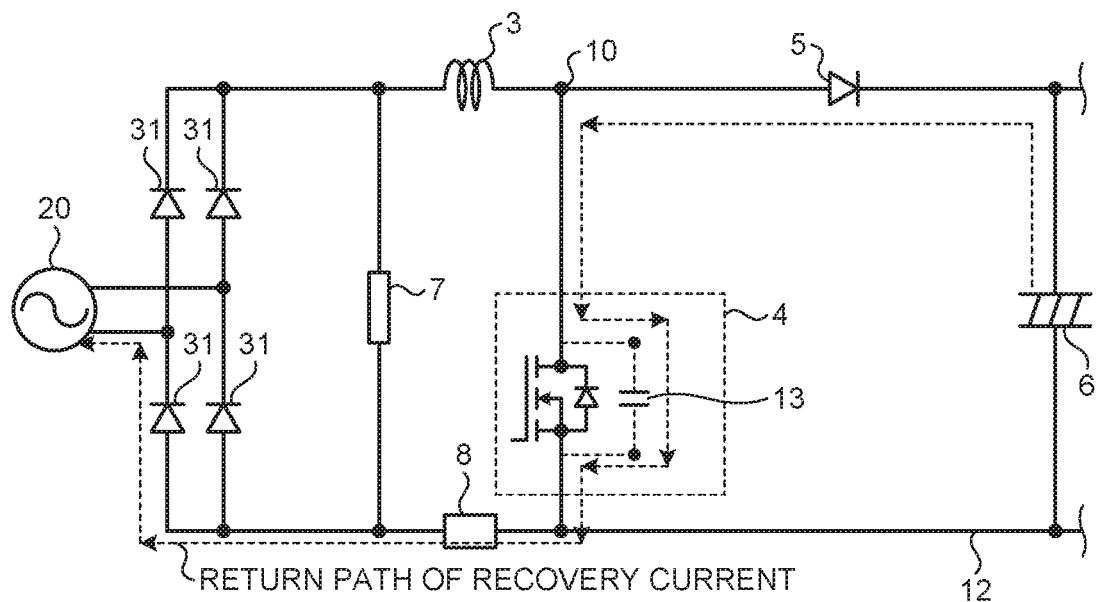
FIG. 2 is a diagram illustrating an example of return path of recovery current in a power converter of a comparative example not including a snubber circuit.

FIG. 2 is a diagram illustrating an example of return path of the recovery current in a power converter of a comparative example not including the snubber circuits. The power converter of a comparative example illustrated in FIG. 2 is assumed to be one in which the snubber circuits are removed from the power converter 40. Note that, for the purpose of facilitating an understanding of the return path of the recovery current, FIG. 2 illustrates only a portion related to the return path of the recovery current in the power converter of the comparative example. In FIG. 2, a parasitic capacitor 13 is an unintended capacitive component that occurs in the switching element 4. In the power converter of the comparative example, turning on of the switching element 4 causes the recovery current flowing from one end of the second capacitor 6 through the second diode 5 to flow through the parasitic capacitor 13 in the switching element 4 into the ground line 12. As illustrated in FIG. 2, the return path of the recovery current partly passes through the ground line 12 in a section between another end of the switching element 4 and the rectification circuit 30. This may reduce detection accuracy in the voltage detection unit 7 and in the current detection unit 8 that are connected to the ground line 12.

Figure 3:
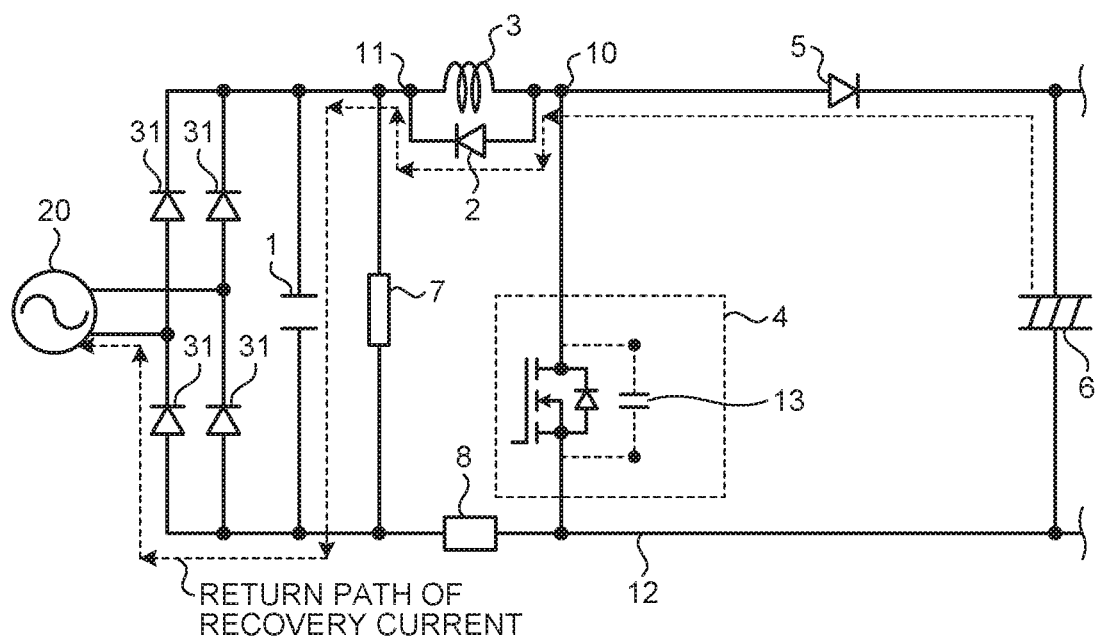
FIG. 3 is a diagram illustrating an example of return path of recovery current in the power converter according to the first embodiment.

FIG. 3 is a diagram illustrating an example of return path of the recovery current in the power converter 40 according to the first embodiment. For the purpose of facilitating an understanding of the return path of the recovery current, FIG. 3 illustrates only a portion related to the return path of the recovery current in the power converter 40. In the power converter 40, turning on of the switching element 4 causes the recovery current flowing from one end of the second capacitor 6 through the second diode 5 to flow through the first diode 2 into the first capacitor 1. The recovery current is absorbed in the first capacitor 1 or flows through the first capacitor 1 to the ground line 12. As illustrated in FIG. 3, the return path of the recovery current partly passes through the ground line 12, but the length of that portion can be reduced as compared to the length of the portion in the power converter of the comparative example illustrated in FIG. 2. The power converter 40 thus provides an advantage in being capable of reducing the decrease in detection accuracy of the voltage detection unit 7 and of the current detection unit 8 as compared to the decrease in the power converter of the comparative example illustrated in FIG. 2.

Due to the need for the recovery current that occurs transiently to pass through, the power converter 40 also desirably uses, as the first diode 2, a highly responsive element employing a wide bandgap semiconductor such as silicon, gallium nitride, gallium oxide, and diamond. In addition, the first diode 2 desirably has a response characteristic equivalent to or faster than the response characteristic of the second diode 5. One typical response characteristic is a reverse recovery time. This enables the snubber circuit including the first diode 2 to also respond to a rapid change in the recovery current, and rapid noise generation caused by the recovery current to thus be suppressed.

The switching element 4 and the first diode 2 formed of a wide bandgap semiconductor as described above are characterized in a low resistance in a conductive state, and are thus capable of reducing loss. In addition, the switching element 4 and the first diode 2 formed of a wide bandgap semiconductor as described above are highly voltage-proof, and thus has a high allowable current density. This enables size reduction of the switching element 4 and of the first diode 2, and use of such switching element 4 and such first diode 2 having a reduced size enables size reduction of a semiconductor module including therein these elements. Moreover, the switching element 4 and the first diode 2 formed of a wide bandgap semiconductor as described above are highly heat resistant. This enables size reduction of a heat-dissipating component, thereby allowing further size reduction of the semiconductor module. Furthermore, the switching element 4 and the first diode 2 formed of a wide bandgap semiconductor as described above has a low power loss. This can achieve a higher efficiency of elements, and thus, a higher efficiency of the semiconductor module.

As described above, according to the first embodiment, the power converter 40 includes a snubber circuit including the first diode 2 and the first capacitor 1, in which the first diode 2 is connected in parallel with the reactor 3 such that the first diode 2 has a polarity to become conductive when a current flows from the switching element 4 side toward the AC power supply 20 thus to allow the recovery current flowing from the second diode 5 to flow into the snubber circuit. The power converter 40 can suppress the recovery current from flowing into the switching element 4, and can thus suppresses occurrence of ringing caused by the recovery current, thereby allowing noise to be reduced or eliminated. In addition, since current does not flow into the snubber circuit except during a transient condition in which the recovery current flows, the power converter 40 can reduce the loss.

Second Embodiment

In the first embodiment, the power converter 40 includes as many first capacitors 1 as the number of the chopper circuits. In a second embodiment, the power converter includes fewer first capacitors 1 than the number of the chopper circuits. Differences from the first embodiment will be described below.

Figure 4:
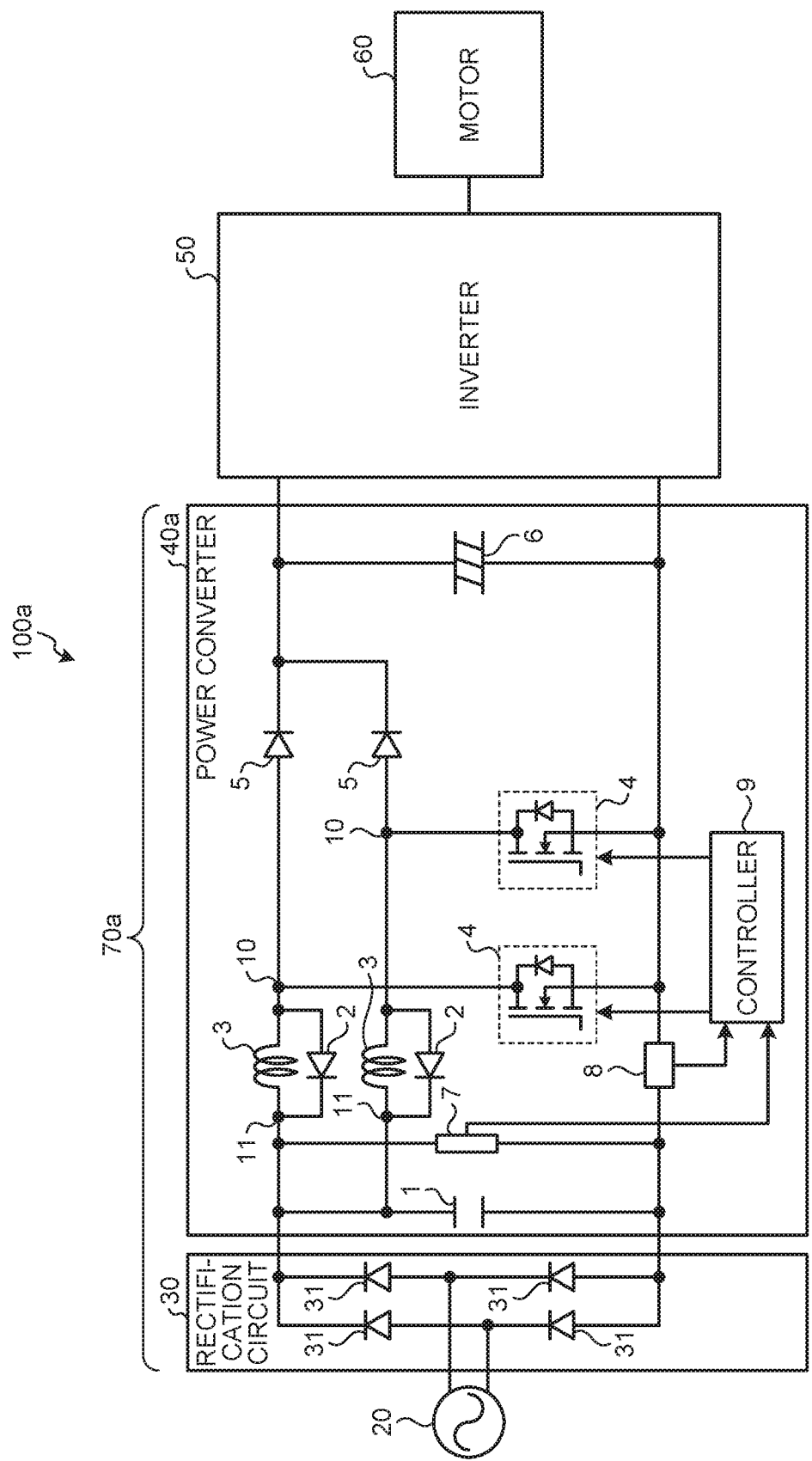
FIG. 4 is a block diagram illustrating an example configuration of a motor driver according to a second embodiment.

FIG. 4 is a block diagram illustrating an example configuration of a motor driver 100a according to the second embodiment. The motor driver 100a includes a power converter 40a in place of the power converter 40 of the motor driver 100 of the first embodiment illustrated in FIG. 1. The rectification circuit 30 and the power converter 40a together constitute a converter 70a.

The power converter 40a is obtained by removing one of the first capacitors 1 from the power converter 40 of the first embodiment illustrated in FIG. 1. As illustrated in FIG. 1, the power converter 40 has the second connection points 11 of the respective chopper circuits connected to each other. That is, it can be said that, in the power converter 40 of the first embodiment, two of the first capacitors 1 are connected in parallel with each other between the connection point at which the second connection points 11 are connected to each other, and the ground line 12. A set of capacitors connected in parallel with each other can be replaced with a single capacitor having a capacity equal to the sum of the capacities of the respective capacitors. Accordingly, the second embodiment integrates the first capacitors 1 into one first capacitor 1. In the second embodiment, a single first capacitor 1 is connected between the connection point at which the second connection points 11 are connected to each other, and the ground line 12.

Note that, similarly to the power converter 40 of the first embodiment, the number of the chopper circuits in the power converter 40a is not limited to two, but may also be one or three or more. In this case, the power converter 40a may include, for example, two first capacitors 1 for four chopper circuits, or two first capacitors 1 for eight chopper circuits.

As described above, the power converter 40a of the second embodiment includes fewer first capacitors 1 than the number of the chopper circuits. This can reduce the circuit size as compared to the first embodiment.

Third Embodiment

In a third embodiment, one of the first diodes 2 and one of the reactors 3 are removed from the power converter 40a of the second embodiment. Differences from the second embodiment will be described below.

Figure 5:
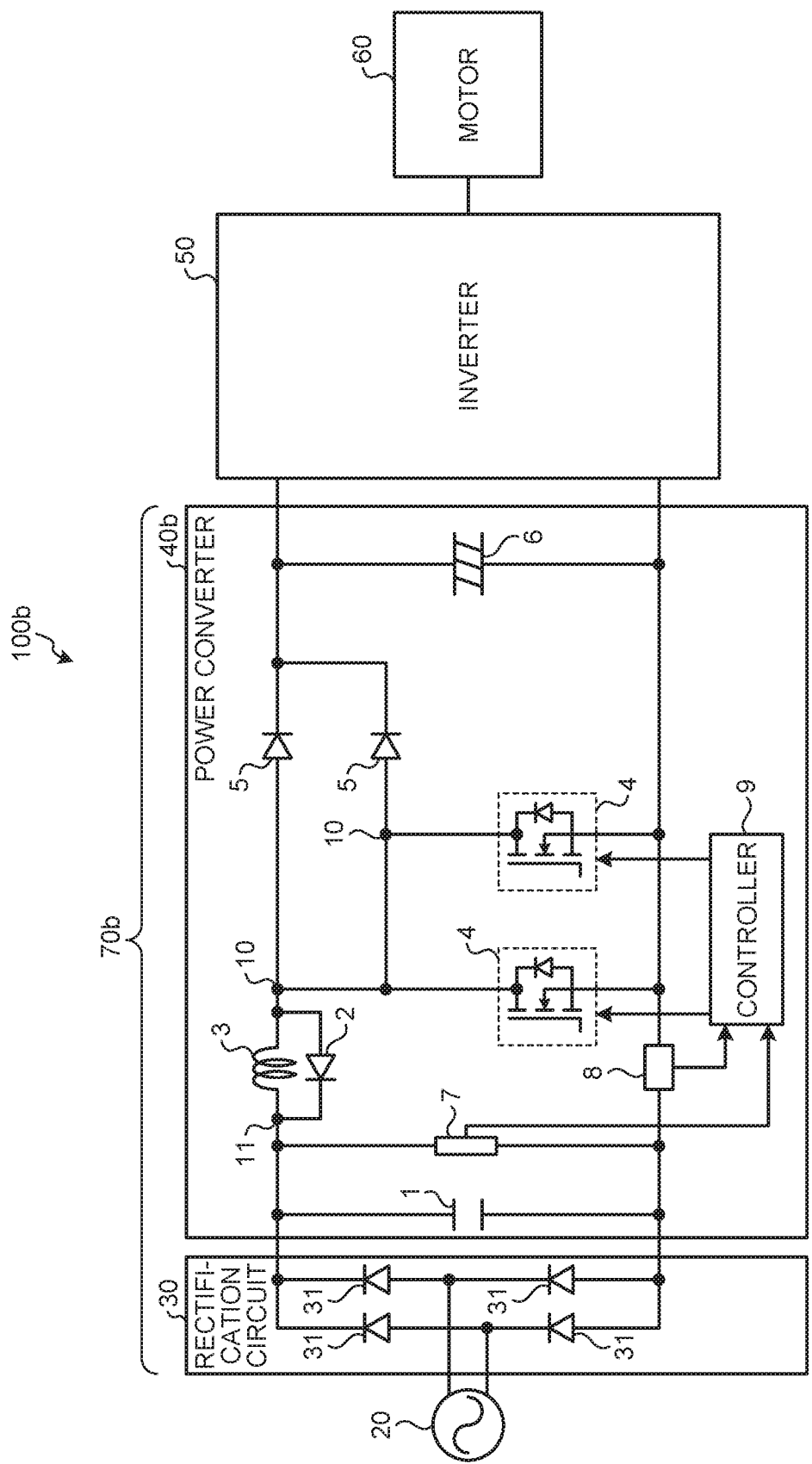
FIG. 5 is a block diagram illustrating an example configuration of a motor driver according to a third embodiment.

FIG. 5 is a block diagram illustrating an example configuration of a motor driver 100b according to the third embodiment. The motor driver 100b includes a power converter 40b in place of the power converter 40a of the motor driver 100a of the second embodiment illustrated in FIG. 4. The rectification circuit 30 and the power converter 40b together constitute a converter 70b.

The power converter 40b is obtained by removing one of the first diodes 2 and one of the reactors 3 from the power converter 40a of the second embodiment illustrated in FIG. 4. The third embodiment integrates the first diodes 2 and the reactors 3 into one first diode 2 and one reactor 3, respectively. Unlike the first and second embodiments, the chopper circuit of the power converter 40b is configured to include the switching element 4 and the second diode 5. In a case in which multiple chopper circuits are included, the power converter 40b is configured such that the chopper circuits are connected in parallel with each other. In the power converter 40b, one end of the reactor 3 and the anode of the first diode 2 are connected to the connection point at which one ends of the respective switching elements 4 are connected to each other.

Note that, similarly to the power converter 40 of the first embodiment, the number of the chopper circuits in the power converter 40b is not limited to two, but may also be one or three or more. In this case, the power converter 40b may be configured such that, for example, two chopper circuits including two switching elements 4 and two second diodes 5 are included, and one first diode 2 and one reactor 3 are connected to the respective chopper circuits.

As described above, the power converter 40b of the third embodiment includes fewer first diodes 2 and fewer reactors 3 than the number of the chopper circuits. This can reduce the circuit size as compared to the first and second embodiments.

Fourth Embodiment

In a fourth embodiment, a capacitor for the snubber circuits is added between the second diodes 5 and the second capacitor 6. This configuration is applicable to any one of the first to third embodiments. The following description will be given for a case of application to the first embodiment by way of example.

Figure 6:
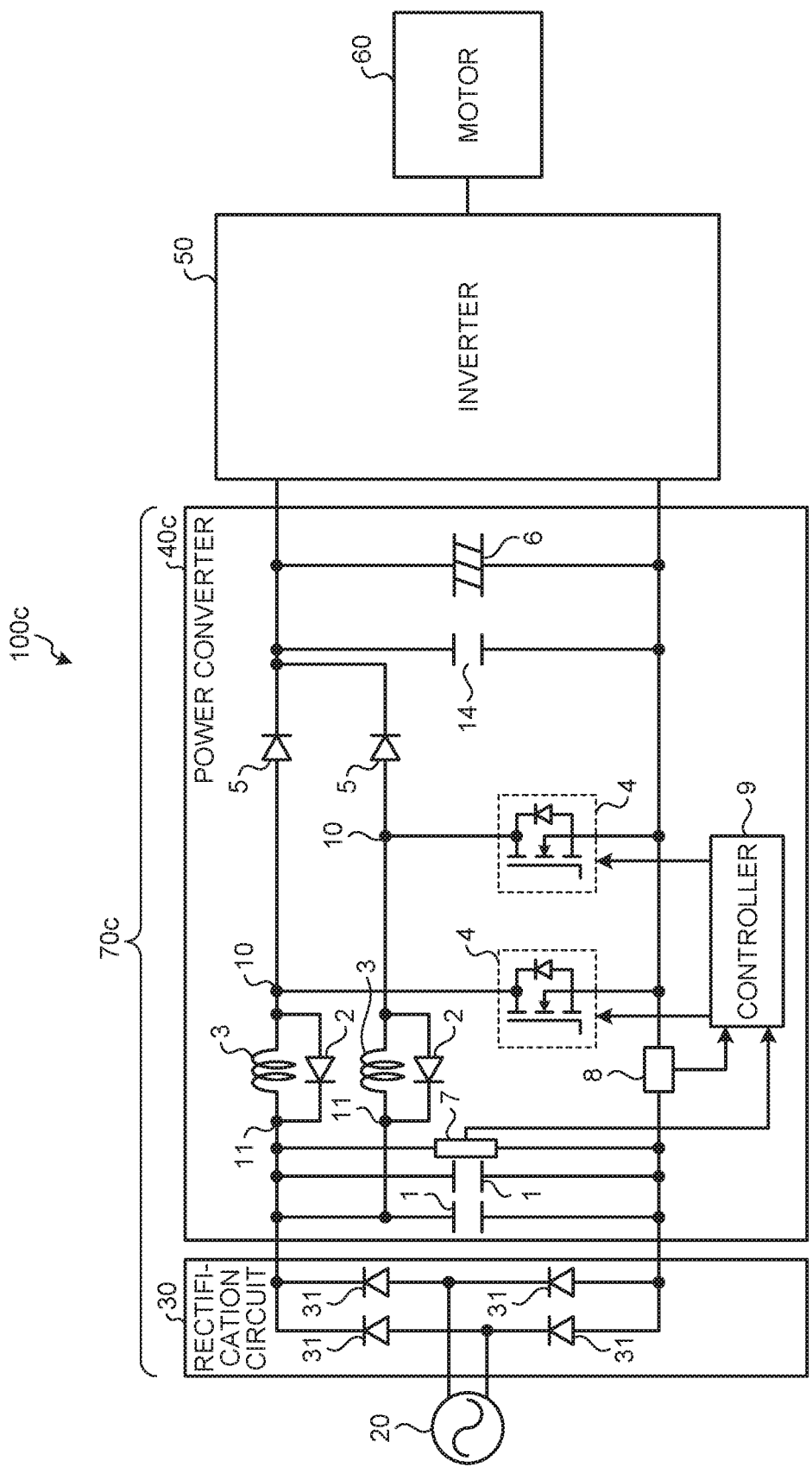
FIG. 6 is a block diagram illustrating an example configuration of a motor driver according to a fourth embodiment.

FIG. 6 is a block diagram illustrating an example configuration of a motor driver 100c according to the fourth embodiment. The motor driver 100c includes a power converter 40c in place of the power converter 40 of the motor driver 100 of the first embodiment illustrated in FIG. 1. The rectification circuit 30 and the power converter 40c together constitute a converter 70c.

The power converter 40c is obtained by adding a third capacitor 14 to the power converter 40 of the first embodiment illustrated in FIG. 1. Upon turning on of the switching element 4, the third capacitor 14 absorbs part of the recovery current flowing from the second capacitor 6 through the second diode 5, or allows part of that recovery current to flow to the ground line 12, and thus reduces the amount of the recovery current flowing through the second diode 5.

As described above, the power converter 40c of the fourth embodiment additionally includes the third capacitor 14 for the snubber circuits between the second diodes 5 and the second capacitor 6. This can reduce the amount of the recovery current flowing from the second diodes 5 as compared to the first embodiment.

Fifth Embodiment

In a fifth embodiment, a configuration will be described in a case in which the motor driver is installed in an air conditioner, which is an example of an air-conditioning and refrigeration apparatus. A case of use of the motor driver 100 of the first embodiment will be described below, though, any of the motor drivers 100 to 100c described in the first through fourth embodiments may be used.

FIG. 7 is a block diagram illustrating an example configuration of an air conditioner 200 according to the fifth embodiment. The air conditioner 200 includes an indoor unit 201 and an outdoor unit 202. The outdoor unit 202 includes an electrical component box 203, a reactor 204, a compressor 205, and a separator 206. The motor 60 is installed in the compressor 205. The converter 70 except the reactor 3, and the inverter 50, of the motor driver 100 are housed in the electrical component box 203. The reactor 204 is the reactor 3 described above, and is attached to the separator 206. The reactor 204 may, in general, be disposed in a different place from the place of the other components of the converter 70 due to a large size and need for heat dissipation. The reactor 204 and the other components of the converter 70 may be directly connected to each other by a wire or via wires and a terminal block.

The configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:
1. A power converter connected between a supply source of a first direct current power and a supply destination of a second direct current power obtained by performing power conversion on the first direct current power, the power converter comprising:
a switching element;
a reactor connected to a first end of the switching element;
a first diode having an anode connected to a first connection point and having a cathode connected to a first end of the reactor, the first end of the switching element and second end of the reactor being connected to each other at the first connection point;
a first capacitor connected in parallel with the supply source and having first end connected to a second connection point, the first end of the reactor and the cathode of the first diode being connected to each other at the second connection point; and
a second diode having an anode connected to the first connection point and having a cathode connected to the supply destination.

2. The power converter according to claim 1, comprising:
a second capacitor connected in parallel with the supply destination and having first end connected to the cathode of the second diode.

3. The power converter according to claim 2, wherein
a recovery current flowing from the second capacitor through the second diode flows through the first diode into the first capacitor after turning on of the switching element.

4. The power converter according to claim 1, wherein
the first diode is formed of a wide bandgap semiconductor.

5. The power converter according to claim 1, comprising:
a plurality of chopper circuits each including the switching element, the reactor, and the second diode, the chopper circuits being connected in parallel with each other such that the second connection points of the respective chopper circuits are connected to each other; and
as many of the first diode as the chopper circuits, the first diodes being connected in parallel with the respective reactors of the respective chopper circuits.

6. The power converter according to claim 5, comprising:
as many of the first capacitor as the chopper circuits, first end of each of the first capacitors being connected to the second connection point of a corresponding one of the chopper circuits.

7. The power converter according to claim 5, wherein
the first end of the first capacitor is connected to a connection point at which the second connection points of the respective chopper circuits are connected to each other.

8. The power converter according to claim 1, comprising:
a plurality of chopper circuits each including the switching element and the second diode, the chopper circuits being connected in parallel with each other such that the first ends of the respective switching elements of the respective chopper circuits are connected to each other, and that the second end of the reactor and the anode of the first diode are connected to a connection point of the first ends of the respective switching elements.

9. The power converter according to claim 1, wherein
the switching element is formed of a wide bandgap semiconductor.

10. The power converter according to claim 1, wherein
the power converter is installed in a converter that converts alternating current power into direct current power.

11. The power converter according to claim 1, wherein
the power converter is installed in an electric motor driver that drives an electric motor.

12. The power converter according to claim 1, wherein
the power converter is installed in an air-conditioning and refrigeration apparatus.

* * * * *